UNITED STATES PATENT OFFICE.

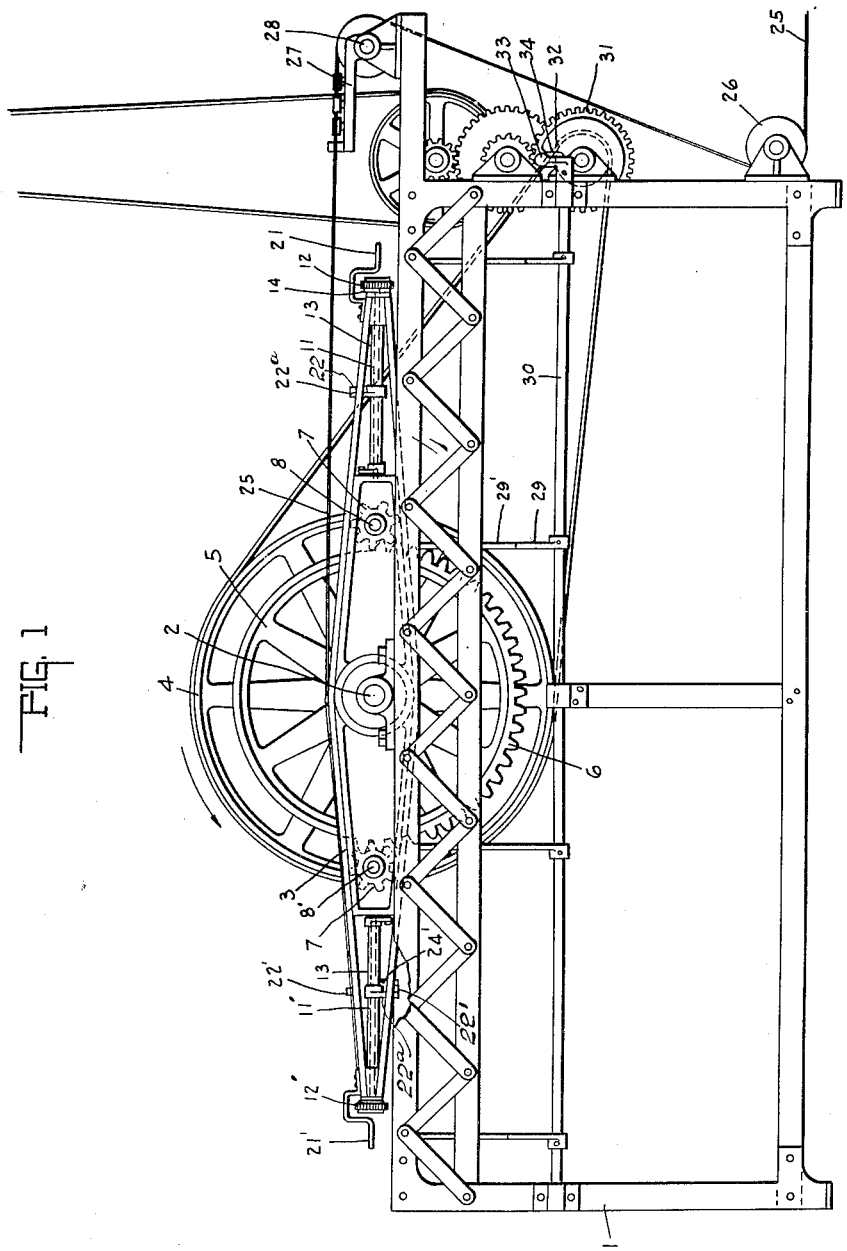

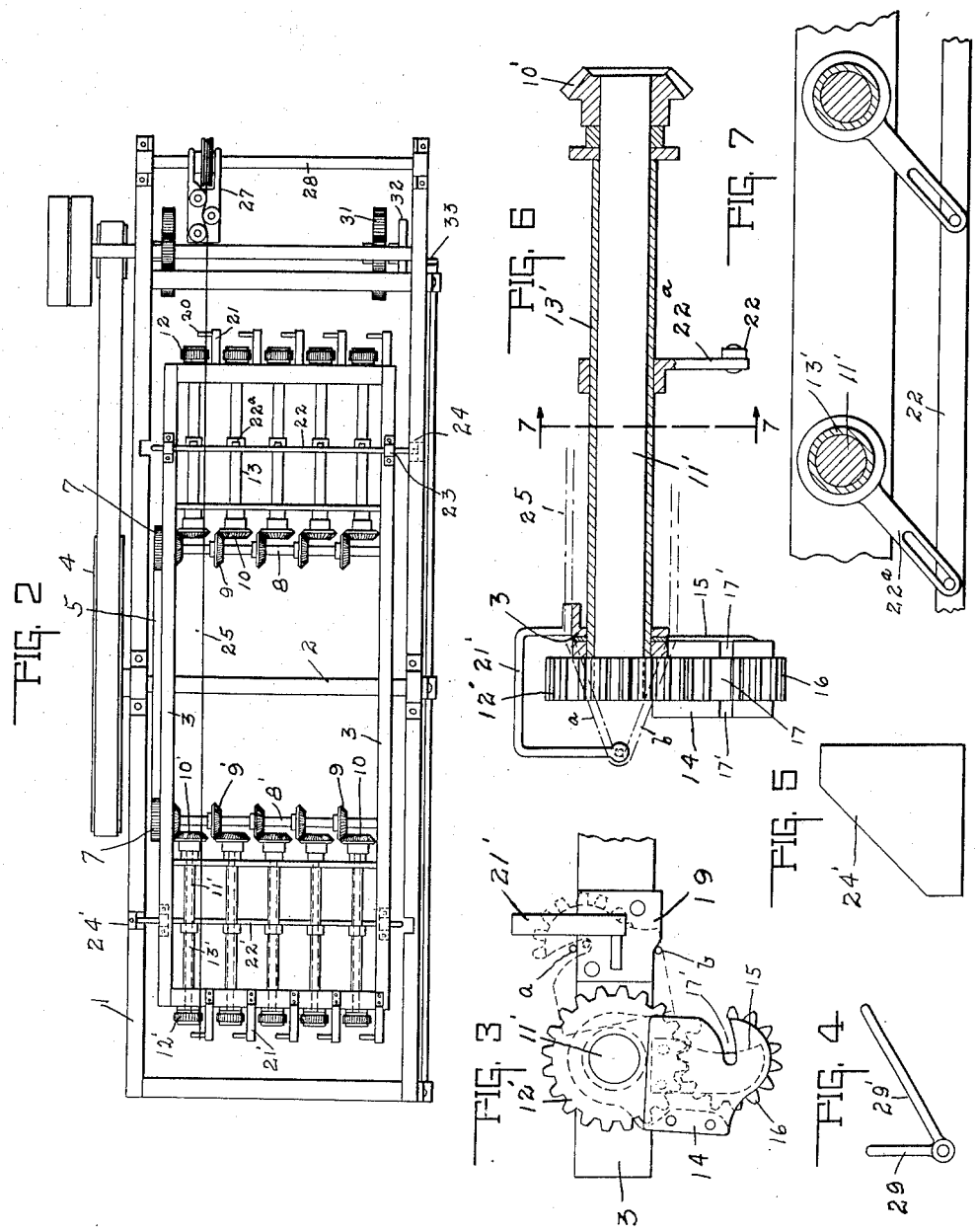

GEORGE W. WHITTINGTON, OF INDIANAPOLIS, INDIANA.

BALE-TIE MACHINE.

1,395,319.　　　　Specification of Letters Patent.　　Patented Nov. 1, 1921.

Application filed January 22, 1920. Serial No. 353,176.

*To all whom it may concern:*

Be it known that I, GEORGE W. WHITTINGTON, a citizen of the United States, residing at Indianapolis, in the county of Marion and State of Indiana, have invented certain new and useful Improvements in Bale-Tie Machines, of which the following is a specification.

This invention relates to bale tie machines, more especially to a machine intended for continuous operation, it being among the objects of my invention to produce a machine which is comparatively simple in construction, reliable, and capable of rapidly forming bale ties in large numbers.

In carrying the objects of my invention into effect, I provide a continuously revolving member carrying twisting elements and cutting devices so as to cause wires to be drawn over the revolving member, bent on itself, and cut off from the bale tie formed just previous. Means are provided for twisting the doubled end of the wire forming a bale tie, cutting off this tie, and so on, continuously forming ties. Preferably I include means for catching and removing the ties as formed and my machine is capable of forming a plurality of ties simultaneously by arranging a corresponding number of devices on the revolving member, which may be of any suitable form.

Referring to the accompanying drawings forming a part hereof and in which similar reference characters denote similar parts, Figure 1, illustrates a side elevation of my new machine, Fig. 2, a plan view thereof, Fig. 3, an enlarged detail of the cutting and twisting elements, Fig. 4, a view of the tie removing means, Fig. 5, of the cam which actuates the cutting and twisting elements.

Fig. 6 is an enlarged detail sectional view through one of the loop forming elements, and Fig. 7 is a sectional view thereof as seen on line 7—7 Fig. 6.

The frame 1 has journaled therein a shaft 2 carrying a revolving member 3 fixed thereto and driven by any suitable form of drive, such as belt and pulley 4. A wheel 5 is mounted concentrically with the shaft 2, but is fixed to the frame. The lower half of wheel 5 is formed with gear teeth 6 which are adapted to mesh with gears 7 journaled in the revolving member 3.

On both sides of shaft 2 and mounted on the revolving member 3 are shafts 8 and 8' secured to gears 7 and carrying beveled gears 9 and 9' meshing with beveled gears 10 and 10' fixed to shafts 11 and 11' placed lengthwise of the revolving member. Gears 12 and 12' are mounted on the outer ends of shafts 11 and 11' which are surrounded by hollow shafts or collars 13 and 13' from which carriages 14 extend downwardly. Cutting blades 15 are fixed thereto and pinions 16 having slots 17 are pivoted in the carriage to mesh with gears 12 and 12'; the cutting devices 15 extend so that the cutting edges protrude into the slots 17, as shown at 18. Complementary cutting blades 19 are formed on the revolving member 3 and coöperate with cutting blades 15. Bending pins 20 are secured to brackets 21 and 21' fixed on the ends of the frame 1.

In order to render the cutting and twisting devices 15 and 16 operative there are provided sets of bars 22 and 22' on both sides of the revolving member and fixed by levers 22ª to members 13 and carried by guides 23 on the revolving member. Cams 24 and 24' mounted on the frame of the machine are adapted to be engaged by the ends of bars 22 and 22' to shift the same and thereby cause members 15 and 16 to be thrown up into operative position and later back into inoperative position.

The wire 25 passes over pulley 26, thence to wire straightener and guiding device 27, the wire straightener being pivoted on shaft 28 to prevent kinking of the wire when the revolving member is in an approximately vertical position. Fingers 29 and 29' mounted on shafts 30 are placed on both sides of the frame and operate through gearing 31, cam 32 and pin 33 operating in cam slot 34 to catch bale ties as they are dropped from the revolving member and remove them to one side of the machine.

The operation of the machine is as follows:

Assuming the position of the parts are as shown in Figs. 1 and 2, the wire 25 having been drawn through the wire straightener 27 and looped around bending pin 20 on bracket 21' at the left or far end of the machine. The machine is then started, the frame 3 being rotated in the direction indicated by the arrow in Fig. 1. This movement brings the pin 20 from the bracket 21' to the right hand end of the machine and extends the wire 25 from end to end of the member 3 with a strand above and one below said member, the wire being given a half bend or loop around the pin 20. Just previous to the member 3 reaching a horizontal position in its revolution the bar 22 strikes the cam 24' and moves the bar 22 lengthwise, and as tubular shafts 13 are pivotally connected to the bar 22 by levers 22ª, said shafts are given a partial rotation.

Since bracket 14 carrying pinion 16 and knife 15 is fixed to the sleeve 13 the rotation of the sleeve throws the bracket 14 upward bringing the slot 17 into engagement with the sections $a$ and $b$ of wire 25, as shown in Fig. 3, the knife 15 severing the lower wire $b$ resting against the knife 19 fixed to the edge of the frame 3, the upward swinging movement of the bracket 14 continuing until the severed end $b$ of the wire 25 extending around the pin 20 is brought into approximate contact with the upper strand $a$ of the wire 25. When the bracket 14 makes approximately one-quarter revolution further rotation of the bracket stops, the arm 22 having traveled the full length of the cam 24'.

Just at the time the rod 22, now at the left end of the machine, strikes the cam 24' and starts to swing the twisting gear 16 to twisting position, the pinion 7 meshes with the teeth 6 and sets up rotation of the pinion 12 through the bevel gears 9 and 10, and as the pinion 12 is rotating in the same direction as the direction of travel of the twisting gear 16 and at the same relative speed, the slot 17 in the gear 16 will remain in registration with the coöperating slots 17' in the carriage or bracket 14 and receive the sections $a$ and $b$ of the wire 25.

As soon as the member 14 reaches the end of its upward swinging stroke, the pinion 12 will cause the gear 16 to rotate and move the slot 17 out of registration with the slots 17' carrying or twisting the severed end $b$ of the wire around the unsevered portion $a$.

The rotation of the pinion 12 and consequently pinion 16 is continued while the revolving member 3 makes one-half of a revolution during which time the free end $b$ of the severed wire is bent around the main portion of the wire 25 approximiately three times forming a complete loop around the pin 20. When the loop has thus been formed bracket 14 carrying pinion 16 is lowered by the movement of rod 22 in the opposite direction caused by the rod striking cam 24. This allows the loop to drop at the right end of the machine at the same instant that cam 24' causes the lower wire at the left end of the machine to be severed, as heretofore described. The bale tie thus formed with its loop at the right end of the machine is now free to fall and is guided in its fall by the fingers 29' secured to the shaft 30. Rotation of the shaft 30 produced through the gearing 31, cam 32 and pin 33 causes the bale ties to be guided to the side of the machine by the fingers 29.

The operation of the machine is continuous and a plurality of bale ties are formed at the same time. There are here shown five sets of twisting and cutting elements, all of which are adapted to be operated simultaneously. However, for simplicity all of the reels of wire with their corresponding wire straighteners have not been shown, only one set of reels and wire straighteners appearing in the drawing.

Having thus fully described my said invention, what I claim as new and desire to secure by Letters Patent, is:

1. A bale tie machine comprising a revolving member, means disposed flatwise to its path of travel for feeding wire thereto, a plurality of cutting devices operable intermittently thereon, and a plurality of wire twisting means also operable intermittently for simultaneously forming a plurality of bale ties, said cutting devices and wire twisting means being arranged in series at each end of the platform and side by side, substantially as set forth.

2. A bale tie machine comprising a continuously revolving member, means for feeding wire thereto, a plurality of cutting devices operable intermittently thereon, and a plurality of wire twisting means also operable intermittently, both cutting and wire twisting means being mounted together and near the ends of said member and resting side by side in the same plane.

3. A bale tie machine comprising a frame, a revolving member, means for feeding wire thereto, a plurality of cutting devices at each end thereof side by side, means for intermittently operating the series of cutting devices at a single operation including cams on said frame, a bar adapted to be shifted by said cams for operating said cutting devices, wire twisting means, and means for operating the same, substantially as set forth.

4. A bale tie machine comprising a frame, a revolving member, means for feeding a plurality of strands of wire thereto, a plurality of cutting devices thereon, means for simultaneously and intermittently operating the same, a plurality of wire twisting means, means for simultaneously operating the same comprising gearing journaled in said member, means for intermittently rotating said gearing comprising a fixed gear having teeth on only a portion of its periphery, and a gear meshing therewith.

5. A bale tie machine comprising a frame, a vertically revolving member, means at one end of the vertically revolving member for feeding wire thereto, a series of cutting devices at each end of the revolving member, means for intermittently and simultaneously operating the said series of cutting devices including cams on said frame, a bar to which said cutting devices are pivotally attached adapted to be shifted lengthwise thereby operating said cutting devices, wire twisting means at each end of the revolving member, means for operating the same, comprising gearing journaled in said member, and means for intermittently rotating said gearing comprising a fixed gear having teeth on only a portion of its periphery, and a gear meshing therewith.

6. A bale tie machine comprising a frame, an elongated revolving member moving in a vertical plane, bending pins on both ends of the same, means for feeding wire over said pins, cutting devices near the ends of said member, wire twisting means in proximity to said cutting devices, and means for operating the same.

7. In a bale tie machine wire cutting and twisting means comprising a slotted revolving pinion orbitally movable, a driven gear meshing therewith, a cutting device mounted in proximity to said pinion and movable therewith, and means for shifting said pinion and cutting device into operative position.

8. In a bale tie machine wire cutting and twisting means comprising a swinging carriage, a slotted revolving pinion loosely mounted thereon, a gear meshing with said pinion, a cutting device mounted on said carriage in proximity to said pinion and movable therewith, and means for shifting said carriage to place the cutting and twisting means into operative position.

9. A bale tie machine comprising a frame, a horizontally disposed elongated revolving member carried by said frame, and means on said revolving member for completing the formation of a plurality of bale ties at one and the same operation.

10. A bale tie machine comprising a stationary frame, an elongated member rotatably mounted on said frame and movable in a vertical direction, a plurality of wire cutting and twisting means at each end of the revolving member, and a plurality of wire straightening and feeding members pivotally mounted on one end of said frame.

In witness whereof, I have hereunto set my hand and seal at Indianapolis, Indiana, this 17th day of January, A. D. nineteen hundred and twenty.

GEORGE W. WHITTINGTON. [L. S.]

Witnesses:
H. C. BIERMAN,
M. L. SHULER.